(12) United States Patent
Hatayama et al.

(10) Patent No.: US 8,800,990 B2
(45) Date of Patent: Aug. 12, 2014

(54) AUTOMATIC DOCUMENT FEEDER AND IMAGE FORMING APPARATUS INCLUDING THE SAME

(75) Inventors: Koji Hatayama, Kanagawa (JP); Yasunobu Youda, Kanagawa (JP); Taku Kudoh, Kanagawa (JP); Takayuki Andoh, Kanagawa (JP); Yohei Osanai, Kanagawa (JP); Satoshi Narai, Kanagawa (JP); Takashi Fujii, Kanagawa (JP)

(73) Assignee: Ricoh Company, Ltd., Toyko (JP)

( * ) Notice: Subject to any disclaimer, the term of this patent is extended or adjusted under 35 U.S.C. 154(b) by 186 days.

(21) Appl. No.: 13/317,408

(22) Filed: Oct. 18, 2011

(65) Prior Publication Data
US 2012/0104676 A1    May 3, 2012

(30) Foreign Application Priority Data
Nov. 2, 2010    (JP) .................................. 2010-246190

(51) Int. Cl.
*B65H 5/02*    (2006.01)
*B65H 5/04*    (2006.01)

(52) U.S. Cl.
USPC ........................... 271/272; 271/273; 271/274

(58) Field of Classification Search
USPC ................................................. 271/272–274
See application file for complete search history.

(56) References Cited

U.S. PATENT DOCUMENTS

| | | | | |
|---|---|---|---|---|
| 1,651,190 A | * | 11/1927 | Dalton | 271/272 |
| 4,619,452 A | * | 10/1986 | Euteneuer et al. | 271/305 |
| 5,441,253 A | * | 8/1995 | Takemoto et al. | 271/34 |
| 6,488,279 B1 | * | 12/2002 | Fukuda et al. | 271/314 |
| 7,200,356 B2 | * | 4/2007 | Kawamoto | 399/405 |
| 7,946,578 B2 | | 5/2011 | Hatayama et al. | |
| 2005/0104273 A1 | * | 5/2005 | Kim | 271/10.01 |
| 2007/0069456 A1 | * | 3/2007 | Jeong | 271/272 |
| 2009/0273134 A1 | | 11/2009 | Hatayama et al. | |

FOREIGN PATENT DOCUMENTS

| | | | | | |
|---|---|---|---|---|---|
| JP | 60242151 A | * | 12/1985 | | B65H 5/06 |
| JP | 64017749 A | | 1/1989 | | |
| JP | 02028441 A | * | 1/1990 | | B65H 5/06 |
| JP | 08208079 A | | 8/1996 | | |
| JP | 2005178981 A | | 7/2005 | | |

OTHER PUBLICATIONS

Abstract of JP 08-208079 published Aug. 13, 1996.
Abstract of JP 2005-178981 published Jul. 7, 2005.
Abstract of JP 64-017749 published Jan. 20, 1989.

* cited by examiner

*Primary Examiner* — Prasad Gokhale
(74) *Attorney, Agent, or Firm* — Harness, Dickey & Pierce

(57) ABSTRACT

An automatic document feeder includes an upstream conveyance roller pair disposed upstream of an image reader including an upstream driving roller and an upstream driven roller; a downstream conveyance roller pair including a downstream driving roller and a downstream driven roller; an upstream auxiliary roller pair including upstream auxiliary rollers disposed coaxially on a shaft of the upstream driving roller and of the upstream driven roller, respectively, each formed of an elastic member and having a diameter greater than that of the adjacent upstream driving roller and of the adjacent upstream driven roller, respectively; and a downstream auxiliary roller pair including downstream auxiliary rollers each disposed coaxially on a shaft of the downstream driving roller and of the downstream driven roller, formed of a low-hardness elastic member and having a diameter greater than that of the adjacent downstream driving roller and of the adjacent downstream driven roller.

11 Claims, 5 Drawing Sheets

AUTOMATIC DOCUMENT FEEDER AND IMAGE FORMING APPARATUS INCLUDING THE SAME

CROSS-REFERENCE TO RELATED APPLICATIONS

The present application claims priority from Japanese patent application number 2010-246190, filed on Nov. 2, 2010, the entire contents of which are incorporated by reference herein.

FIELD OF THE INVENTION

The present invention relates to an automatic document feeder incorporated in an image forming apparatus such as a printer, a copier, a facsimile machine, and a multi-function apparatus having one or more capabilities of the above devices, and to an image forming apparatus incorporating the automatic document feeder.

BACKGROUND OF THE INVENTION

In Optical Character Recognition (OCR) technology in which image information of an original such as a paper document is read by an image reader such as a scanner to create electronic data, an automatic document feeder is frequently used. In the automatic document feeder, each original is automatically extracted and separated from a bundle of originals sequentially one by one and is conveyed or fed to the image reader so that the image information of the original image is read by the image reader. The structure in which this type of automatic document feeder is combined with the image forming apparatus is well known.

Typically, the automatic document feeder includes a pair of rollers to convey the original to the image reader upstream from the original reading line position of the image reader and another pair of rollers to discharge the original conveyed to the image reader therefrom.

In the automatic document feeder including such roller pairs, when the original is read to obtain the image information, upon the original entering between the rollers and going out of the rollers, the original receives conveyance load and the original conveyance speed fluctuates. The change in the original conveyance speed occurs similarly at an original reading line position, which causes the image information to be shifted and the image to be output on the recording medium or sheet with color shifted.

Specifically, color shift occurs in the image reader or device in which the RGB image reading line (scan line) is not disposed at the same place relative to the image conveyance direction and when fluctuation in conveyance speed occurs on the RGB image reading line. In addition, it is understood that such irregularity in speed occurs due to deformation of the conveyance materials such as the original or the conveyance roller pair when a drastic load change occurs with respect to the conveyed original. Typical times at which such drastic load changes occur are when a leading edge of the original enters between the conveyance roller pair closest to and downstream from the image reading line, and when the original exits the conveyance roller pair closest to and upstream of the image reading line.

Conventionally, various measures have been thought out to improve this type of color shift. For example, by increasing the diameter of the rollers used as the roller pair, the shock given to the roller pair when the original enters between rollers and therefrom is minimized. However, when the roller diameter is increased, the automatic document feeder cannot be downsized and as a result, the image forming itself cannot be downsized contrary to the requirement of the users.

Another approach is to reduce an interval between the conveyance paths immediately before the original enters into the image reader and immediately after the original exits the image reader. However, designing of the conveyance interval within such a range so as not to clog the original considering the thermal deformation and assembly errors is difficult, and further, a method to eliminate the conveyance path interval by using an elastic member such as mylar (registered trademark) has a problem in that the Mylar™ itself becomes a load when the original enters between rollers.

Yet another approach involves forming the original conveyance path maximally linearly and disposing the conveyance roller pair which is near the image reading line in the vicinity of the reading line. The above measure has a disadvantage in that, due to its importance to the structure of the automatic document feeder, the application of such a design is not allowed. Another problem is that the roller pair comes to bite the reading device. Another approach is to replace the reading white board mounted on the reading line with a belt or a roller, but doing so makes the device complicated and expensive.

JP-S64-17749-A discloses an image reading apparatus including an original discharge roller having an expanded diameter part and a driven roller driven to rotate accompanied by the original discharge roller. The expanded diameter part has a diameter larger than that of the original discharge roller, is less rigid, and is disposed at least at one side of the outer periphery of an outer diameter of the original discharge roller, the outer diameter defining a predetermined reading speed. The invention disclosed by JP-S64-17749-A aims to improve stacking of sheet originals by installing a guide member for leading the original to the contact position between the original discharge roller and the driven roller and the outside diameter in the expanded diameter part, in the original discharge part. However, the disclosed invention may not prevent fluctuations in the original conveyance speed when the original strikes between the roller pair and exits therefrom.

BRIEF SUMMARY OF THE INVENTION

The present invention provides an automatic document feeder capable of minimizing color shift when reading an original image that is inexpensive, has a compact size, and an uncomplicated structure, and an image forming apparatus including such an optimal automatic document feeder. Specifically, an automatic document feeder includes: an upstream conveyance roller pair disposed upstream relative to an image reading line position of an image reader in a conveyance direction of an original, and including an upstream driving roller and an upstream driven roller; a downstream conveyance roller pair disposed downstream relative to an image reading line position of an image reader in the conveyance direction of an original, and including a downstream driving roller and a downstream driven roller; an upstream auxiliary roller pair including upstream auxiliary rollers disposed coaxially on a shaft of the upstream driving roller and of the upstream driven roller, respectively, each of the upstream auxiliary rollers formed of an elastic member and having a diameter greater than that of the adjacent upstream driving roller and of the adjacent upstream driven roller, respectively; and a downstream auxiliary roller pair including downstream auxiliary rollers disposed coaxially on a shaft of the downstream driving roller and of the downstream driven roller, respectively, each of the downstream auxiliary rollers formed of a low-hardness elastic member and having a diameter greater than that of the adjacent downstream driving roller and of the adjacent downstream driven roller, respectively.

These and other objects, features, and advantages of the present invention will become apparent upon consideration of the following description of the preferred embodiments of the present invention when taken in conjunction with the accompanying drawings.

BRIEF DESCRIPTION OF THE DRAWINGS

FIGS. 4A and 4B are explanatory views illustrating a state in which an original being conveyed by a pair of upstream conveyance rollers and a pair of downstream conveyance rollers and exiting from the pair of upstream conveyance rollers receives a load change, in which FIG. 4A shows a case in which a linear speed of the pair of upstream conveyance rollers is faster than that of the pair of downstream conveyance rollers, and FIG. 4B shows a case in which a linear speed of the pair of upstream conveyance rollers is slower than that of the pair of downstream conveyance rollers;

FIGS. 9A and 9B are graphs illustrating experimental results of the color shift amount when downstream driven rollers employ soft rubber having hardness of 30 degrees and polyoxymethylene (POM) material, in which FIG. 9A illustrates use of soft rubber and FIG. 9B illustrates use of POM material.

DETAILED DESCRIPTION OF THE INVENTION

Hereinafter, preferred embodiments of the present invention will now be described with reference to the accompanying drawings.

Figure 1:
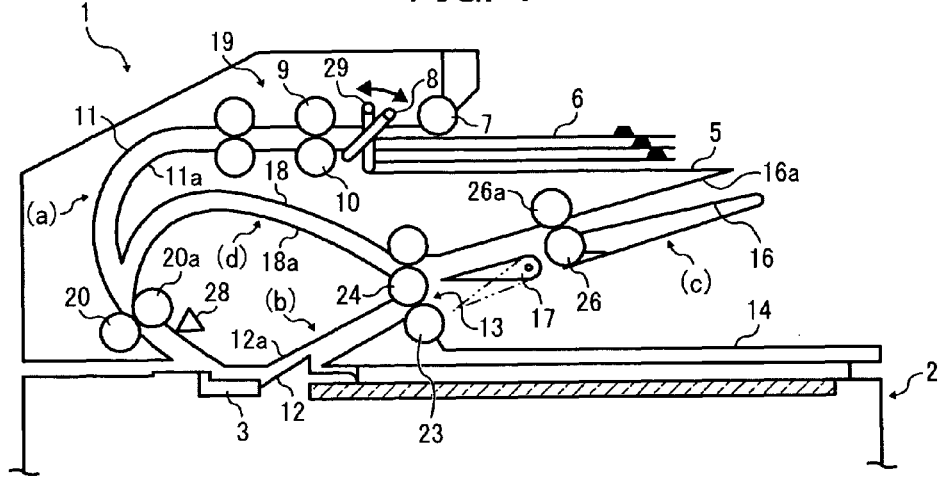
FIG. 1 is a cross-sectional view of an automatic document feeder according to an embodiment of the present invention.

First, basic structure, operation, and effect of an automatic document feeder according to one embodiment of the present invention will be described with reference to FIG. 1. FIG. 1 shows a cross-sectional view of the automatic document feeder. This automatic document feeder can be mounted to, for example, a copier, a printer, a facsimile machine, and a multifunction apparatus including two or more.

As illustrated in FIG. 1, reference numeral 1 denotes an automatic document feeder which is openably disposed on and above an image reader or device 2 such as a scanner. The image reader 2 is provided with a slit glass 3 serving as a reading position on its surface thereof, which is a commonly known structure. When an original having images thereon passes through the linear image reading position below the slit glass 3, image information of the original can be read. In addition, the automatic document feeder 1 as illustrated in FIG. 1 is configured to be operable manually by a user or automatically to select either a single-sided mode in which one side of the original is read and a duplex mode in which both sides of the original are read. The operation of the automatic document feeder 1 is controlled by the selected mode. The illustrated example shows a structure capable of handling both the single-sided mode and the duplex mode; however, the present invention is not limited to such a structure and can be applied to an automatic document feeder capable of handling the single-sided mode only.

An original 6 is set on an original platen 5 of the automatic document feeder 1 with an image containing surface directed upwards in a sequential order of the number of pages. Reference numeral 7 denotes a pickup roller. The pickup roller 7 is in a standby mode separated by a predetermined interval from the original platen 5. A detector 8 serves to detect whether the original is set on the original platen 5 or not. When the detector 8 detects that the original is set on the original platen 5 and a start command to start reading operation is input via an operation panel, not shown, the pickup roller 7 comes down from the standby position to move to a position contacting an upper surface of the original 6. In addition, the original platen 5 is provided with an original shutter 29. The original shutter 29 is restricted from rotating when the pickup roller 7 remains in a standby mode, and is released from the restriction to rotate in an arrow direction in FIG. 1 when the pickup roller 7 lowers to start reading operation. Accordingly, the user sets the original to abut the original shutter 29 so that the leading edge of the original can be aligned. The original shutter 29 is disposed with a shift from the detector 8, such as a feeler, to detect the set original in the original width direction (or a vertical direction relative to the sheet surface in FIG. 1).

The originals the original platen 5 by the pickup roller 7 are conveyed to the original separation section including a feed roller 9 and a reverse roller 10 to separate sheets from a topmost sheet one by one sequentially. A separation pad may be substituted for the reverse roller 10. A conveyance path (a) in FIG. 1 is formed between guides 11 and 11a, and serves as an original conveyance path to convey the originals separated one by one by the feed roller 9 and the reverse roller 10 in the original separation section onto the slit glass 3. A conveyance path (b) is defined by guides 12 and 12a, and serves as an original conveyance path to convey the original on which images are read on the slit glass 3 to an original discharge port 13. Reference numeral 14 denotes a sheet discharge tray on which originals discharged from the original discharge port 13 are stacked. Further, a switchback conveyance path (c) is provided to the automatic document feeder 1 as illustrated in FIG. 1. A guide 16 is disposed above the sheet discharge tray 14. The switchback conveyance path (c) is disposed between the guide 16 and a branching claw 17 and a guide 16a. The switchback conveyance path (c) serves to switch back the original conveyed via the original discharge port 13 and refeed it to the conveyance path (a) from its trailing edge thereof. The branching claw 17 is disposed above the original tray 14. As illustrated in FIG. 1, the branching claw 17 is switched to a position indicated by a dotted line to guide the original to the switchback conveyance path (c) via the sheet discharge port 13. When the original is introduced into the switchback conveyance path (c), the branching claw 17 returns to the position indicated by a solid line, thereby introducing the original that has been switched back by the switchback conveyance path (c) to the conveyance path (d) from its trailing edge thereof. This conveyance path (d) is disposed between the guides 18 and 18a serves to convey the switched back original onto the slit glass 3, as a reading position, and joins the aforementioned conveyance path (b).

Furthermore, a pair of reverse rollers 26 and 26a each of which has the ability to switch between a normal rotation and a reverse rotation are provided. When the reverse roller pair 26 and 26a rotates normally, the original being conveyed from the original discharge port 13 is introduced into the switchback conveyance path (c). Thereafter, when the branching claw 17 is switched over as described above, the reverse roller pair 26 and 26a is reversed, whereby the original is conveyed to the conveyance path (d). Reference numeral 28 denotes a detector disposed between a pair of upstream conveyance rollers 20, 20a disposed upstream of the original conveyance direction relative to the image reading line position provided below the slit glass 3 and a pair of downstream conveyance rollers 23, 24 disposed downstream of the original conveyance direction. The detector 28 detects a leading edge of the original conveyed by rotational driving of the pair of upstream conveyance rollers 20, 20a to thus obtain a timing to start reading images at the image reading line position. The detector 28 can detect a trailing edge of the original and reading images on the original can be terminated in sync with the obtained trailing edge detection signal.

Next, operation of such an automatic document feeder 1 as configured above will now be described.

First, the single-sided reading mode for reading image information of only one side of the original will be described. When an original is set on the original platen 5, the detector 8 to detect the set original such as a feeler rotates to switch an ON/OFF signal of the detector. In a state in which single-sided mode is set, a start key provided on an operation panel, not shown, is pushed down to instruct a start of reading, whether the original is set on the original platen 5 or not is checked via the ON/OFF signal of the original set detector 8. If it is determined that the original is set, a motor, not shown, starts a normal rotation, the pickup roller 7 comes down to push the original and rotates in a clockwise direction in the figure, so that the original is conveyed to the original separation section composed of the feed roller 9 and the reverse roller 10. The original sent out by the pickup roller 7 is separated one by one sequentially by the original separation section and is conveyed to the conveyance path (a). Next, when a leading edge of the original 6 conveyed through the conveyance path (a) is detected by the detector 28, reading start timing is obtained, and reading starts on the slit glass 3 at a timing aligned with the leading edge of the original. In addition, when the trailing edge of the original is detected by the sensor 28, the reading end timing is obtained, and reading ends at the timing aligned with the trailing edge of the original. In a case of the single-sided mode, because the branching claw 17 resides constantly at a position indicated by a solid line in FIG. 1, the original 6 after reading images thereon is discharged from the original discharge port 13 to the discharge tray 14, and is stacked thereon with its image surface down. The motor, not shown in the figure, is driven constantly. A linear speed of the pair of conveyance rollers 19 disposed in the conveyance path (a) is set higher than that of the feed roller 9, thereby creating an interval between sheets. Upon completion of reading of all originals, the motor rotates reversely to raise and move the pickup roller 7 to a standby position. After the pickup roller 7 rises to a predetermined standby position, the motor stops, and image reading in the single-sided mode terminates.

Next, the duplex mode in which both sides of the original are read will now be described. Even in a state in which a duplex mode is set, the same operation as in the single-sided mode is performed. Specifically, when the start key provided on the operation panel, not shown, is pushed down to instruct a start of reading, whether the original is set on the original platen 5 or not is checked via the ON/OFF signal of the original set detector 8. If it is determined that the original is set, a motor, not shown, starts a normal rotation, the pickup roller 7 comes down to push the original and rotates in a clockwise direction in the figure, so that the original is conveyed to the original separation section composed of the feed roller 9 and the reverse roller 10. The original sent out by the pickup roller 7 is separated one by one sequentially by the original separation section and is conveyed to the conveyance path (a). Successively, in the duplex mode, when the leading edge of the original 6 is detected by the detector 28, reading start timing is obtained and the reading starts in sync with the leading edge of the original. When the detector 28 detects the leading edge, the branching claw 17 is rotatably moved to a position indicated by a dotted line in the figure, and further, the reverse roller pair 26, 26a is rotated in the normal direction (or the clockwise direction in the figure). Further, when the leading edge of the original 6 is detected by the detector 28, driving of the feed roller 9 and the pickup roller 7 is released by use of a clutch, not shown, so that the next original is controlled not to be fed to the original separation section.

Next, when the trailing edge of the original is detected by the sensor 28, a timing to finish reading is obtained so that the reading ends in sync with the arrival of the trailing edge of the original. In the duplex mode, because the branching claw 17 is moved to the position indicated by a dotted line in FIG. 1, the original is conveyed to the switchback path (c) via the sheet discharge port 13. Then, after a predetermined time T elapses from the detection by the detector 28, that is, enough time has passed so that the trailing edge of the original completely passes through the sheet discharge port 13, the branching claw 17 is switched to the position indicated by the solid line in FIG. 1, the rotation direction of the reverse roller pair 26, 26a is reversed (that is, in the counterclockwise direction in the figure), and the original is introduced to the conveyance path (d). The original that has been introduced into the conveyance path (d) is again sent to the conveyance path (a). Then, when the leading edge of the original is detected by the detector 28, similarly to the image reading of a first surface, reading operation of a backside surface of the original 6 is performed. When the leading edge of the original is detected by the detector 28 in the image reading operation of the backside surface, the branching claw 17 is again moved to the position indicated by the dotted line in FIG. 1, the original the backside surface of which has been read is again conveyed to the switchback conveyance path (c), and the reverse roller pair 26, 26a is rotated in the normal direction. Then, as described above, when a predetermined time has elapsed after the original passes through the detector 28, the rotation direction of the pair of reverse rollers 26, 26a is reversed. Thus, the original the backside surface reading operation of which has been completed is again switched back via the conveyance paths (c) and (d) to be sent to the conveyance path (a), in which reading operation is not performed. Further, even though the leading edge of the original is detected by the detector 28, the branching claw 17 remains at the position indicated by the solid line so that the original is discharged to the sheet discharge tray 14. By conveying the original as above, the original after reading both sides can be stacked on the sheet discharge tray 14 with its first surface facing downward. In addition, when another original exists, that is, when the original set detector 8 continues to detect an original, feeding operation of a next original is performed upon the detector 28 detecting that the trailing edge of the previous original has passed the detector 28 three times. Subsequently, until the original set detector 8 does not detect an original, the above operation will be repeated and the duplex image reading operation as to the originals on the original platen 5 will be completed.

Figure 2A:
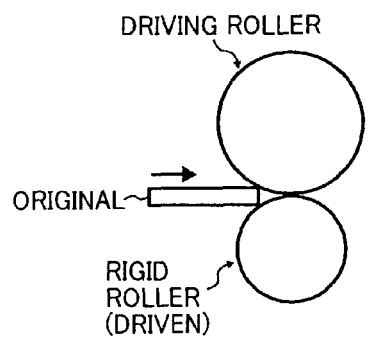
FIGS. 2A and 2B are explanatory views illustrating a state in which an original entering between a pair of conveyance rollers receives a load change in a case in which a driven roller of the pair of conveyance rollers is rigid.
Figure 2B:
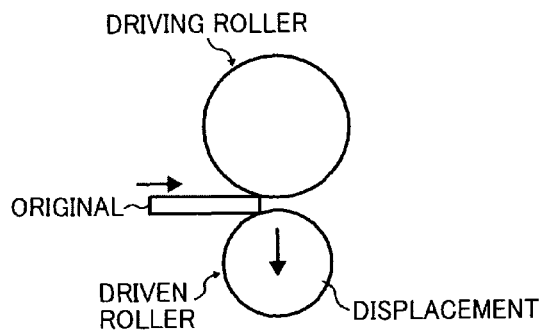
Figure 3A:
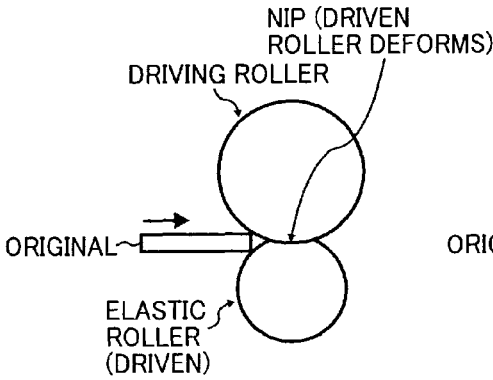
FIGS. 3A and 3B are explanatory views illustrating a state in which an original entering between a pair of conveyance rollers receives a load change in a case in which a driven roller of the pair of conveyance rollers is elastic.
Figure 3B:
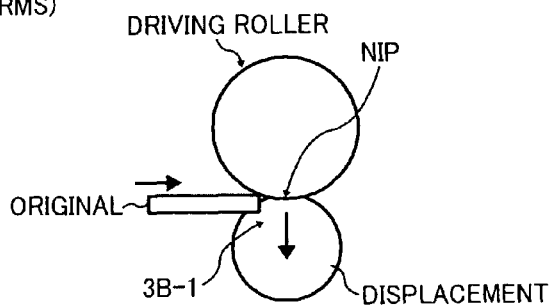
Figure 4A:
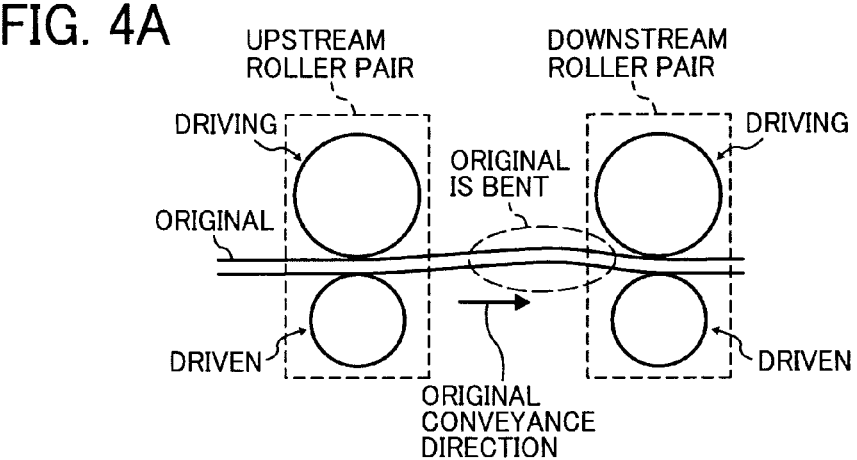
Figure 4B:
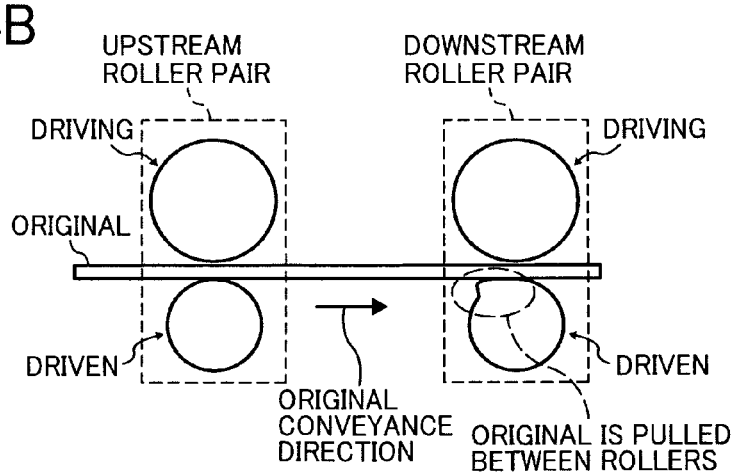

In the automatic document feeder 1 as configured as above, a phenomenon called color shift that sometimes appears in the image read out from the original at the image reading line position will now be described with reference to FIGS. 2 to 4. As described heretofore, the upstream roller pair is provided upstream in the original conveyance direction relative to the image reading line position, and the downstream rollers pair is provided downstream in the original conveyance direction relative to the image reading line position. FIGS. 2A and 2B are explanatory views illustrating a state in which when an original enters between a pair of conveyance rollers, the original receives a conveyance load change. In FIGS. 2A and 2B, driven rollers among the pair of conveyance rollers are formed of rigid rollers. (See FIG. 1 as to the pair of upstream conveyance rollers 20, 20a and the pair of downstream conveyance rollers 23, 24.) FIGS. 3A and 3B are explanatory views illustrating a state in which the original receives a conveyance load change when entering into the conveyance roller pair in a case in which a driven roller among the pair of conveyance rollers is formed of an elastic roller. Further, FIGS. 4A and 4B are explanatory views illustrating a state in which an original being conveyed by both the upstream conveyance roller pair and the downstream conveyance roller pair receives a conveyance load change when passing through the upstream conveyance roller pair. Specifically, FIG. 4A shows a case in which a linear speed of the upstream conveyance roller pair is faster than that of the downstream conveyance roller pair and FIG. 4B shows a case in which a linear speed of the upstream conveyance roller pair is slower than that of the downstream conveyance roller pair.

As illustrated in FIGS. 2A and 2B, a case in which the driven roller among the conveyance roller pair is a rigid roller will be described first. Meanwhile, in the conveyance roller pairs as illustrated in FIGS. 2 to 4, for the sake of simplicity, the upper rollers are driving rollers configured to receive a driving force from a drive source, not shown, to rotate by itself. The lower rollers are driven rollers accompanied by the rotation of the driving rollers. First, by the time immediately before the original strikes the pair of conveyance rollers (as in FIG. 2A), the lower driven roller is driven by receiving the rotational driving of the upper driving roller. Then, when the original strikes the pair of conveyance rollers, the lower driven roller is configured to displace downward by an amount equal to the thickness of the original. In this case, the original being conveyed is subjected to a load by motion energy in accordance with the displacement amount of the driven roller as well as a conveyance load change because the driven roller is immediately separated from the driving roller to thus exert a load on the original due to the lack of driving force, which causes uneven speed and a color shift in the read image to occur.

To reduce the conveyance load on the original, conceivably the driven roller can be made of an elastic material as illustrated in FIGS. 3A and 3B. If the driven conveyance roller is formed as an elastic body as illustrated in FIG. 3B, when the original is conveyed and strikes the nip portion formed by the driving roller and the driven roller, the driven roller itself deforms and the displacement downward decreases. As a result, the motion energy according to the displacement amount of the driven roller declines because the deformation can absorb the motion energy (3B-1), and the conveyance load change against the conveyed original can be reduced by that amount. Furthermore, because the driven roller is formed of an elastic member, even when the original strikes the nip portion, the driving force from the driving roller is not immediately separated completely, thereby reducing the load from the driven roller itself. Accordingly, by forming the driven roller as an elastic member, compared to a case in which the driven roller is a rigid member, color shift in the read image due to the conveyance load change with respect to the original can be reduced.

However, even though each of the driven rollers of the upstream and downstream conveyance roller pair is formed as an elastic member, there is a limit to the amount of reduction of the original conveyance load which can be achieved when the original passes through the nip and is not satisfactory. For example, as illustrated in FIG. 4A, when the linear speed of the upstream conveyance roller pair is higher than that of the downstream conveyance roller pair, the original tends to be bent, and therefore, such a structure cannot be adopted. Then, in general, as illustrated in FIG. 4B, adopting a configuration in which the linear speed of the upstream conveyance roller pair is lower than that of the downstream conveyance roller pair is unavoidable.

In this case, to prevent the color shift from occurring by reducing the conveyance load change of the original, if the driven roller (of both upstream and downstream side) employs a more elastic or less hard material, the elastic downstream driven roller deforms badly due to a tensile force generated because the linear speed of the upstream conveyance roller pair is lower than that of the downstream conveyance roller pair and toward the upstream conveyance roller pair via the original sandwiched between the upstream conveyance roller pair and the downstream conveyance roller pair. With this much deformation, when the original passes through the upstream conveyance roller pair, the tensile force from the upstream conveyance roller pair via the original is released, and as a result, a resilient force is generated to the downstream driven roller, resulting in the original being subjected to a change in the conveyance load due to uneven conveyance speed. It should be noted that the upstream and downstream driving rollers serve to control the conveyance speed of the original and should not be made from relatively soft elastic materials because such materials cause uneven conveyance speed. Accordingly, the driving rollers cannot employ a softer material to prevent color shift.

Thus, the automatic document feeder of the present invention is configured such that an upstream conveyance roller pair is disposed upstream of the original conveyance direction relative to the original reading line position of the image reader, the upstream conveyance roller pair includes an upstream drive roller and an upstream driven roller, an upstream auxiliary roller is provided on each shaft of the upstream drive roller and of the upstream driven roller, each of the upstream auxiliary rollers is disposed opposite each other and is contacted with each other to form an upstream auxiliary roller pair. As to the downstream conveyance roller pair, the downstream auxiliary roller pair is similarly formed. In addition, the upstream auxiliary rollers each include a diameter larger than that of an adjacent driving roller or driven roller, and are formed of an elastic material with a lower hardness. Similarly, the downstream auxiliary rollers each include a diameter larger than that of an adjacent driving roller or driven roller, and are formed of an elastic material with lower hardness.

Figure 5:
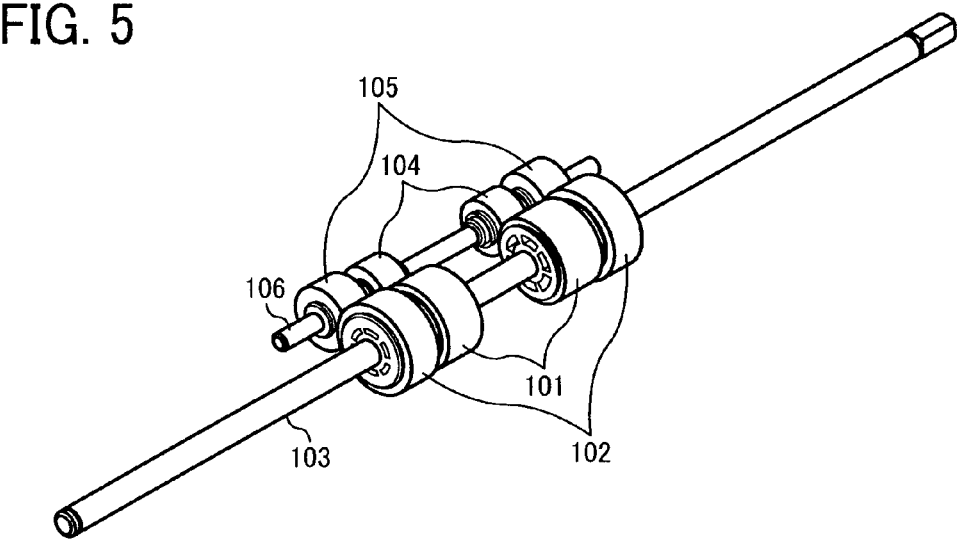
FIG. 5 is an oblique view of the pair of conveyance rollers according to the present invention, in which auxiliary rollers are disposed on respective roller shafts of the pair of conveyance rollers.

FIG. 5 shows an oblique view of a pair of conveyance rollers including auxiliary roller pairs of either upstream or downstream side. Reference numeral 101 in FIG. 5 denotes either of the upstream or downstream driving rollers. Namely, the driving roller 101 corresponds to either the upstream driving roller 20 or the downstream driving roller 23. Similarly, reference numeral 104 denotes either of the upstream or downstream driven rollers. Namely, the driven roller 104 corresponds to either the upstream driven roller 20a or the downstream driven roller 24.

As illustrated in FIG. 5, the auxiliary driving roller 102 is disposed coaxially with a shaft 103 of the driving roller 101. The shaft 103 is connected directly with the driving roller 101 and is configured to transmit a driving force from the driving source, not shown, to the driving roller 101. It is to be noted that the auxiliary driving roller 102 has a diameter larger than that of the driving roller 101. Further, the auxiliary driven roller 105 is disposed coaxially with a shaft 106 of the driven roller 104. The driven roller 104 rotates idle and is driven by a rotary driving force from the driving roller 101. This auxiliary driven roller 105 has a diameter larger than that of the driven roller 104.

In the present invention, as illustrated in FIG. 5, each of a pair of upstream auxiliary rollers is disposed respectively on roller shafts for the upstream drive rollers and for the upstream driven rollers. Each of the upstream auxiliary rollers has a diameter greater than that of the adjacent upstream drive rollers and of the adjacent upstream driven rollers and is formed of a low-hardness elastic member. A pair of downstream auxiliary rollers is configured identically with the pair of upstream auxiliary rollers. Because the present automatic document feeder includes and is formed of the above auxiliary roller pairs, the original to be conveyed first strikes the upstream auxiliary roller pair or the downstream auxiliary roller pair but the conveyance load received by the original which strikes the conveyance roller pair afterwards can be reduced due to deformation of the elastic auxiliary roller pair itself that initially absorbs the motion energy when the original strikes. In addition, when passing through the upstream conveyance roller pair, the original is subjected to a reduced conveyance load. This is because the auxiliary roller pair has a larger diameter than that of the upstream conveyance roller pair, and therefore the conveyance load change caused by the resilience of the downstream conveyance roller pair to be applied to the original is reduced because the upstream auxiliary roller pair holds the original and the original which has passed through the upstream conveyance roller pair is held by the downstream auxiliary roller pair as well, and the restoring force of the downstream driven roller is absorbed by the downstream auxiliary roller pair. Accordingly, the conveyance load change, which cannot be alleviated only by a structure in which the driven rollers are formed of elastic member as described above, can be minimized. As a result, the color shift in the read image from the original can be minimized.

Figure 6A:
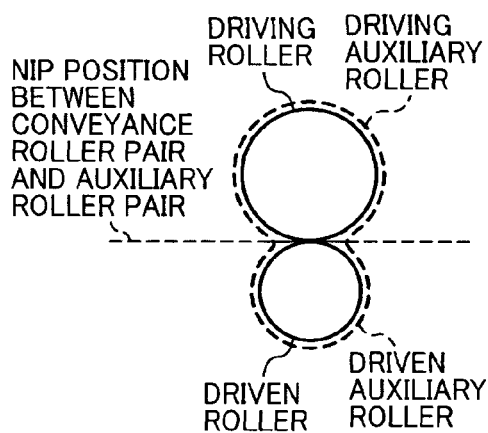
FIGS. 6A and 6B are schematic views illustrating a difference between a case in which the auxiliary rollers are disposed at both sides as in FIG. 6A and a case in which the auxiliary rollers are disposed at either side as in FIG. 6B.
Figure 6B:
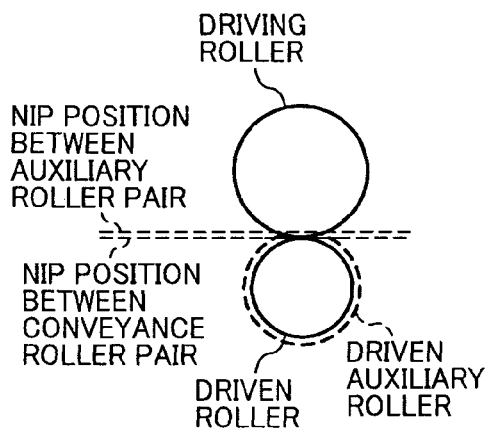

Herein, with reference to FIG. 6, a description is now given of a difference between a case in which the auxiliary rollers are disposed oppositely at both the driving side and the driven side, and a case in which the auxiliary roller is disposed oppositely at either the driving side or the driven side. As illustrated in FIG. 6B, when the auxiliary roller is disposed either side (only the driven roller among the conveyance roller pair in FIG. 6B), a nip portion of the original formed between the conveyance roller pair, the main rollers, is different from a position of the original on the auxiliary roller, thereby causing a skew of the original in the roller shaft direction. Further, if the original being conveyed to the nip first contacts the conveyance rollers without auxiliary rollers (see a driving roller in FIG. 6B), the color shift occurring when the original strikes the nip is different from a case in which auxiliary rollers are provided, and the final image quality consequently varies. There is also a possibility that the nip portion may be deviated from the conveyance path due to the lack of auxiliary rollers. Thus, as illustrated in FIG. 5 and FIG. 6A, it is preferable that the driving auxiliary rollers and driven auxiliary rollers constructing auxiliary roller pairs be employed, and that the hardness of the oppositely disposed auxiliary rollers and the diameter of the roller be identical, so that the nip between the conveyance roller pairs and that between the auxiliary roller pairs can be maintained at substantially the same position.

Tests were conducted on a structure in which an auxiliary pressing section, formed of an elastic member, having a diameter larger than that of a driven roller, is provided to the driven roller side only, and a structure in which a part of the surface of the driven roller is formed of an elastic member such as a soft rubber to cope with the color shift using an apparatus similar to the image forming apparatus as illustrated in FIG. 1 as a tester similarly. In the experiments, the elastic member was provided to the driven roller side only. As a result, it was observed that there was no color shift improving effect.

Figure 7:
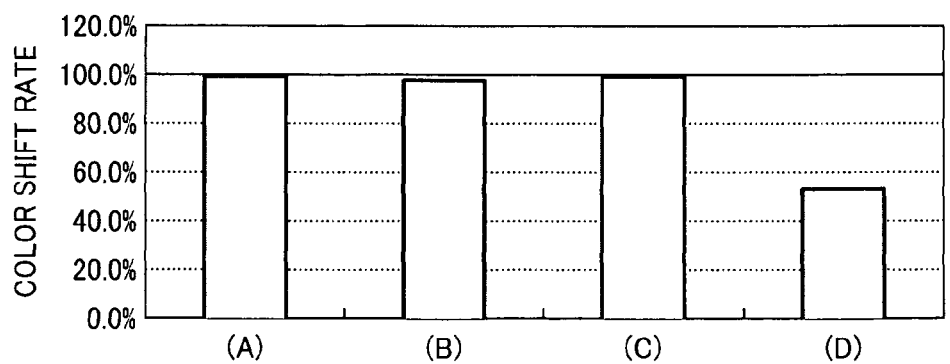
FIG. 7 is a graph illustrating a color shift rate with the color shift amount in a conventional automatic document feeder without auxiliary rollers set as a reference, in which (A) shows a case in which the driven rollers only include elastic auxiliary rollers formed of low-hardness sponge; (B) shows a case in which the driven rollers only include elastic auxiliary rollers formed of medium-hardness sponge; (C) shows a case in which the driven rollers only include elastic auxiliary rollers formed of high-hardness sponge; and (D) shows a case in which the driving and driven rollers include elastic auxiliary rollers formed of low-hardness sponge.

More specifically, FIG. 7 is a graph showing the above evaluation result. FIG. 7 shows a color shift rate when a case in which the elastic auxiliary roller is not provided is set as a reference. Specifically, elastic auxiliary rollers are provided only to the driven roller side in (A) to (C), and the elastic member is low hardness sponge in (A), the elastic member is medium hardness sponge in (B), and the elastic member is high hardness sponge in (C). By contrast, the elastic auxiliary rollers are provided to both the driving roller side and the driven roller side and the elastic member is low hardness sponge in (D). In FIG. 7, 100% shows the same color shift amount as that in the conventional example without auxiliary rollers. That the color shift rate is closer to 100% means that there is no improvement in the color shift amount. That the color shift rate decreases shows that an improvement in the color shift amount is observed.

When performing the evaluation, an original with a thickness of 110K was used and image reading was performed three times, and the maximum value of the color shift generated was compared. To compare the structure of the present invention, (D) in FIG. 7 shows a case in which the elastic auxiliary rollers are provided to both the driving roller side and the driven roller side and the auxiliary rollers formed of the same low hardness sponge are disposed oppositely so that the nip portion between the conveyance roller pair and the nip portion between the auxiliary rollers are substantially the same. As is apparent from FIG. 7, its color shift is greatly reduced by making the nip portion between the conveyance roller pair and that between the auxiliary rollers substantially the same.

Figure 8A:
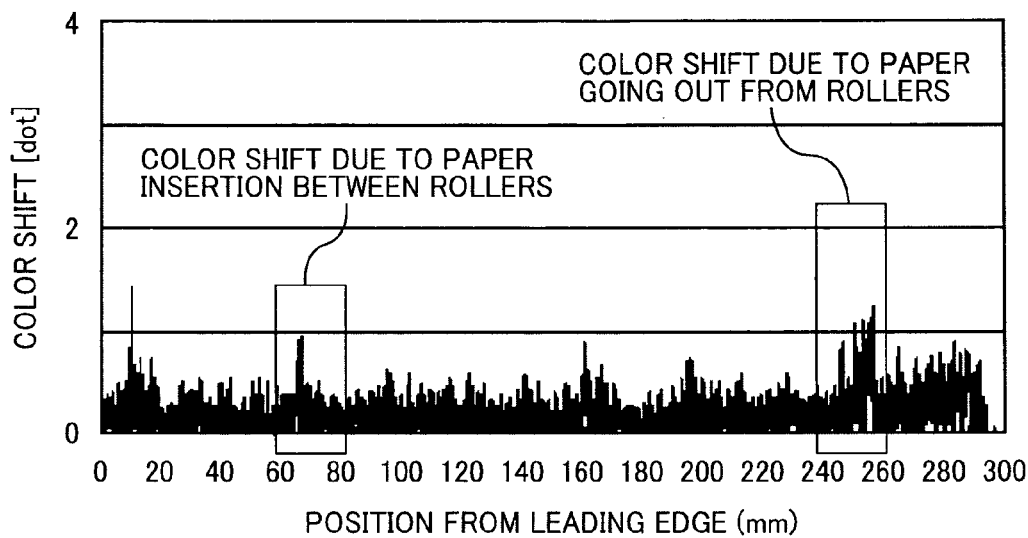
FIGS. 8A and 8B are graphs illustrating differences in the color shift amount between a case in which the driving auxiliary rollers are independently driving rollers in FIG. 8A and a case in which the driving auxiliary rollers are not independently driving rollers which rotate idle on the shaft of the driving rollers in FIG. 8B.
Figure 8B:
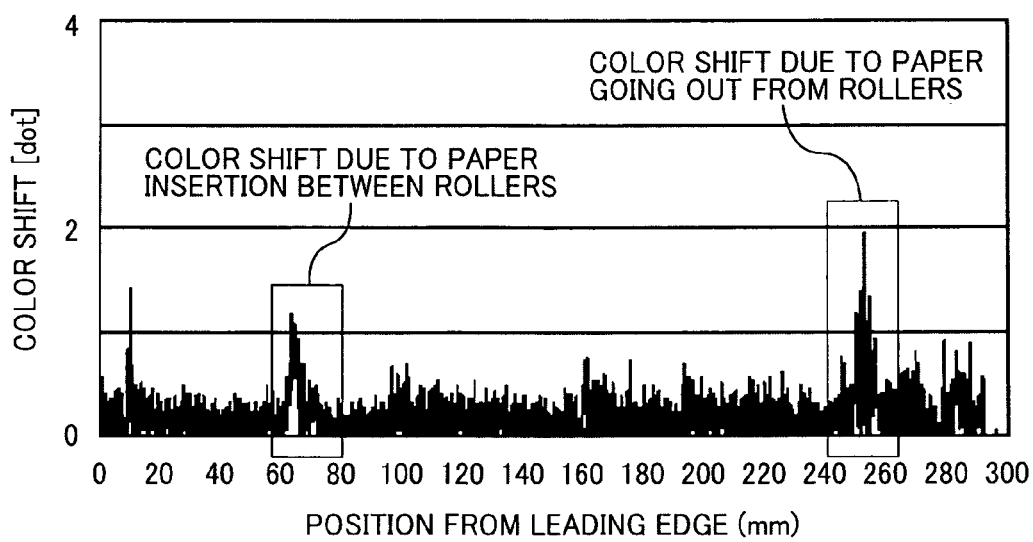

Further, in a structure as illustrated in FIG. 5, both the driving rollers 101 rotatably driving to convey the original and the driving auxiliary roller 102 are constructed to drive by themselves by being driven by the driving force from the shaft 103. Specifically, the driving auxiliary roller 102 is connected directly to the shaft 103 identical to the driving roller 101. Therefore, when the shaft 103 rotates to drive the driving roller 101, the driving auxiliary roller 102 also rotatably drives. The roller structure as illustrated in FIG. 5 may be applied to both the upstream and the downstream side of the image reader seen from the original conveyance direction. More specifically, both the upstream auxiliary rollers and the downstream auxiliary rollers disposed on a respective shaft coaxially with the upstream driving rollers and the downstream driving rollers are driving in conjunction with the upstream driving rollers and the downstream driving rollers, respectively. Thus, by causing the driving auxiliary rollers 102 to rotate independently, when the driving auxiliary roller 102 rotates, the driven auxiliary roller 105 is also driven to rotate. Accordingly, when the original strikes the auxiliary roller pair, the auxiliary roller pair never fails to be driven to rotate. The energy to start to rotate the auxiliary roller pair when the original strikes is not obtained from the original currently being conveyed. Therefore, a favorable effect can be obtained because the conveyance load change with respect to the original can be reduced FIGS. 8A and 8B show differences in a color shift amount in a case in which the driving auxiliary roller 102 is driven to rotate by itself (in FIG. 8A) and in a case in which the driving auxiliary roller 102 is not driven to rotate by itself (in FIG. 8B). In FIG. 8B, the driving auxiliary roller 102 rotates idle on the shaft 103. As is apparent from FIG. 8, color shift increases if the driving auxiliary roller is not driven to rotate independently.

Herein, as explained with reference to FIGS. 4A and 4B, if the hardness of the driven roller among the downstream conveyance roller pair is decreased and has too much elasticity, when the trailing edge of the original passes through the upstream conveyance roller pair, color shift occurs due to the resilience of the downstream driven roller from its preceding deformation. Thus, preferably a material having a hardness of greater than 70 degrees is employed for the downstream conveyance roller of the downstream conveyance roller pair, so that the auxiliary roller pair mainly may serve to attenuate the motion energy when the original strikes to reduce the displacement of the driven roller. As configured as above, because the auxiliary roller pair according to the present invention is softer than the conveyance roller pair, that is, the auxiliary roller pair is composed of soft elastic members, the original conveyance force to convey the original of the auxiliary roller pair is less than that of the conveyance roller pair. In addition, because the conveyance roller pair can hold the original securely, a favorable effect can be obtained such that the color shift due to the resilience from the deformation rarely occurs.

Figure 9A:
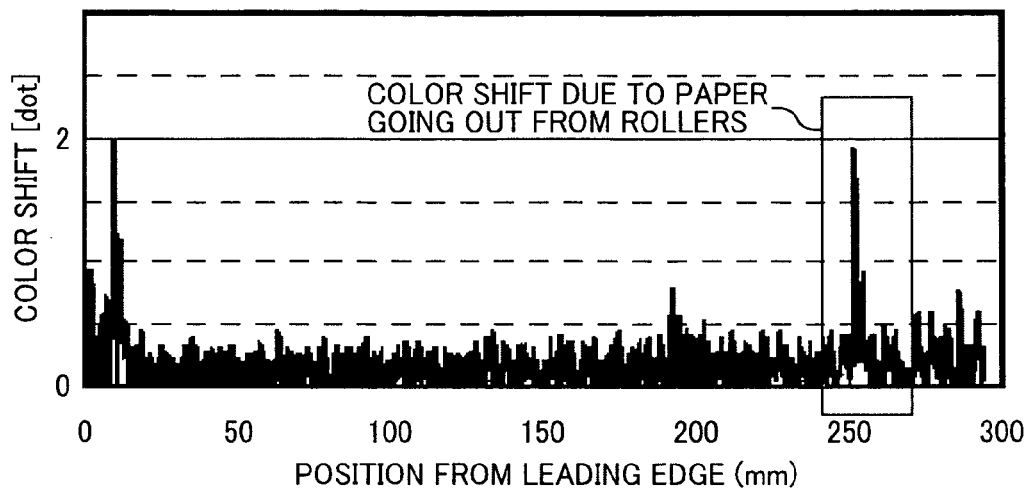
Figure 9B:
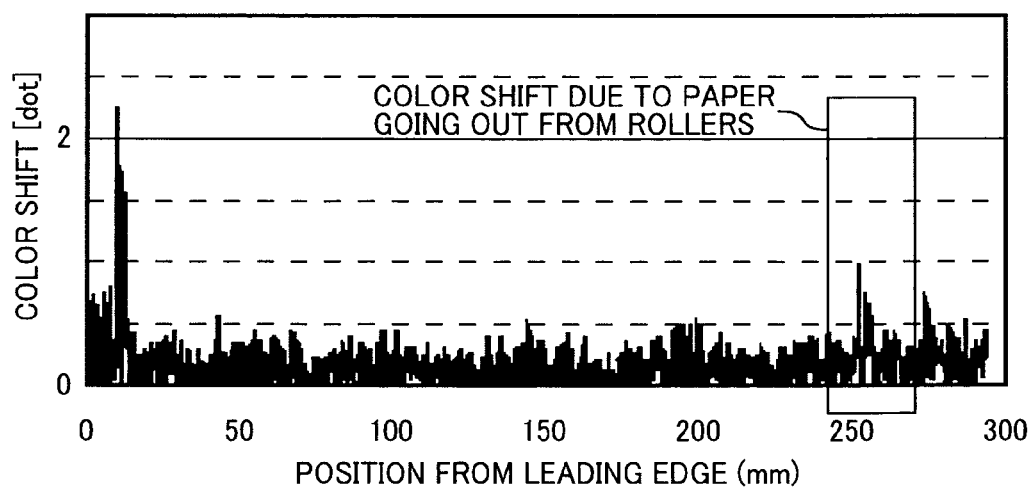

FIGS. 9A and 9B show results of an experiment conducted to ascertain a color shift amount when the downstream driven roller employs a soft rubber (i.e., rubber with a hardness of 30 degrees) (FIG. 9A) and when the downstream driven roller employs a POM material (FIG. 9B). In the experiment as illustrated in FIG. 9, an original with a thickness of 45K was used. As FIGS. 9A and 9B show, by adopting a structure employing an auxiliary roller pair and employing a relatively hard material such as POM for the downstream auxiliary rollers, the color shift could be further minimized.

The automatic document feeder according to the present invention has been described above. Because an image forming apparatus such as a copier, printer, facsimile machine, or multifunction apparatus including two or more such capabilities in combination mounting this type of automatic document feeder is commonly known, it can be appreciated by those skilled in the art that the automatic document feeder of the present invention is readily applicable to such an image forming apparatus. The image forming apparatus to which the automatic document feeder as disclosed in the present invention is applied can reduce the color shift in the output image, and therefore, a higher quality image can be produced.

Additional modifications and variations of the present invention are possible in light of the above teachings. It is therefore to be understood that, within the scope of the appended claims, the invention may be practiced other than as specifically described herein.

What is claimed is:

1. An automatic document feeder comprising:
an upstream conveyance roller pair disposed upstream relative to an image reading line position of an image reader in a conveyance direction of an original and including an upstream driving roller and an upstream driven roller, the upstream driving roller and the upstream driven roller being in contact in a state in which the original is not conveyed;
a downstream conveyance roller pair disposed downstream relative to the image reading line position of an image reader in the conveyance direction of an original and including a downstream driving roller and a downstream driven roller, the downstream driving roller and the downstream driven roller being in contact in a state in which the original is not conveyed;
an upstream auxiliary roller pair including upstream auxiliary rollers disposed coaxially on each shaft of the upstream driving roller and of the upstream driven roller, respectively, each of the upstream auxiliary rollers having a diameter greater than that of the adjacent upstream driving roller and of the adjacent upstream driven roller, respectively, each of the upstream auxiliary rollers being formed of a first elastic member having a lower hardness than a material of the upstream driving roller and a material of the upstream driven roller such that a nip between the upstream driving and driven rollers is in the same position as a nip between the upstream auxiliary roller pair; and
a downstream auxiliary roller pair including downstream auxiliary rollers disposed coaxially on each shaft of the downstream driving roller and of the downstream driven roller, respectively, each of the downstream auxiliary rollers having a diameter greater than that of the adjacent downstream driving roller and of the adjacent downstream driven roller, respectively, each of the downstream auxiliary rollers being formed of a second elastic member having a lower hardness than a material of the downstream driving roller and a material of the downstream driven roller such that a nip between the downstream driving and driven rollers is in the same position as a nip between the downstream auxiliary roller pair.

2. The automatic document feeder as claimed in claim 1, wherein the upstream auxiliary roller and the downstream auxiliary roller disposed coaxially with the upstream driving roller and the downstream driving roller, respectively, are driven to rotate in conjunction with the upstream driving roller and the downstream driving roller, respectively.

3. The automatic document feeder as claimed in claim 1, wherein the downstream driven roller is formed of a material having a hardness of at least 70 degrees.

4. The automatic document feeder of claim 1, wherein the original passes in between the upstream auxiliary driving roller and the upstream auxiliary driven roller.

5. The automatic document feeder of claim 1, wherein the lower hardness of the first elastic member is the same as the lower hardness of the second elastic member.

6. An automatic document feeder comprising:
   at least one pair of conveyance rollers disposed relative to an image reading line position of an image reader in a conveyance direction of an original, the at least one pair of conveyance rollers including a driving roller and a driven roller, the driving roller and the driven roller forming a nip by being in contact in a state in which the original is not conveyed; and
   at least one pair of auxiliary rollers disposed coaxially on each shaft of the driving roller and the driven roller of the at least one pair of conveyance rollers, the at least one pair of auxiliary rollers including an auxiliary driving roller and an auxiliary driven roller having a greater diameter than the driving and driven rollers adjacent to the at least one pair of auxiliary rollers, each of the auxiliary driving roller and the auxiliary driven roller being formed of a first elastic member having a lower hardness than a material of the driving roller and a material of the driven roller of the at least one pair of conveyance rollers such that a nip between the auxiliary driving roller and the auxiliary driven roller is in the same position as the nip between the at least one pair of conveyance rollers.

7. The automatic document feeder as claimed in claim 6, wherein the at least one pair of conveyance rollers is disposed in an upstream direction relative to the image reading line position of the image reader in the conveyance direction of the original.

8. The automatic document feeder as claimed in claim 7, further comprising:
   a second pair of conveyance rollers disposed in a downstream direction relative to an image reading line position of an image reader in a conveyance direction of an original, the second pair including a downstream driving roller and a downstream driven roller, the downstream driving roller and the downstream driven roller forming a nip by being in contact in a state in which the original is not conveyed; and
   a second pair of auxiliary rollers disposed coaxially on each shaft of the driving roller and the driven roller of the second pair of conveyance rollers, the second pair of auxiliary rollers including a downstream auxiliary driving roller and a downstream auxiliary driven roller having a greater diameter than the downstream driving roller and the downstream driven roller adjacent to the at least one pair of auxiliary rollers, each of the downstream auxiliary driving roller and the downstream auxiliary driven roller formed of an elastic material with a lower hardness than a material of the downstream driving roller and the downstream driven roller such that a nip formed between the downstream auxiliary driving roller and the downstream auxiliary driven roller is in the same position as the nip between the second pair of conveyance rollers, the original passing in between the auxiliary downstream driving roller and the auxiliary downstream driven roller upon the original being conveyed.

9. The automatic document feeder as claimed in claim 8, wherein the at least one pair of auxiliary rollers and the second pair of auxiliary roller disposed coaxially with the driving roller and the downstream driving roller, respectively, are driven to rotate in conjunction with the driving roller and the downstream driving roller, respectively.

10. The automatic document feeder as claimed in claim 8, wherein the downstream driven roller is formed of a material having a hardness of at least 70 degrees.

11. The automatic document feeder of claim 6, wherein the original passes in between the auxiliary driving roller and the auxiliary driven roller of the at least one pair of auxiliary rollers.

* * * * *